United States Patent [19]

Statz

[11] 4,054,968
[45] Oct. 25, 1977

[54] SMALL GAME HOLDER

[76] Inventor: Wilbert A. Statz, 1913 Skeels Ave., Eau Claire, Wis. 54701

[21] Appl. No.: 624,936

[22] Filed: Oct. 22, 1975

[51] Int. Cl.$^2$ .................................................. A22C 25/00
[52] U.S. Cl. ............................................. 17/44.2; 17/70
[58] Field of Search ................... 17/70, 40, 44.2, 69, 17/56, 62, 66, 50, 1 R, 11.1 R, 44, 44.1, 59, 61, 64, 44.3; 248/276, 174

[56] References Cited

U.S. PATENT DOCUMENTS

| 20,703 | 6/1858 | Emeigh | 17/70 |
|---|---|---|---|
| 1,880,680 | 10/1932 | Benn | 17/44.2 |
| 2,624,910 | 1/1953 | Peterson | 17/70 |
| 2,825,928 | 3/1958 | Thornton | 17/70 |
| 2,981,972 | 5/1961 | Zebarth | 17/44.1 |
| 3,137,030 | 6/1964 | Varner | 17/44.2 |
| 3,237,240 | 3/1966 | Bednar | 17/70 |
| 3,568,243 | 3/1971 | Hines | 17/44.2 |
| 3,744,090 | 7/1973 | Burke | 17/70 |

*Primary Examiner*—Russell R. Kinsey
*Assistant Examiner*—Mickey Yu

*Attorney, Agent, or Firm*—Clarence A. O'Brien; Harvey B. Jacobson

[57] ABSTRACT

An upstanding panel member and plate are provided and include upstanding opposite side edges. One side edge of the panel member extends upwardly along and is secured to one side of the plate intermediate its upstanding side edges and the lower end of the panel member and plate rest upon and are anchored to a horizontal base plate. The edge of the panel member remote from the plate includes an upper end portion which is inclined upwardly and inwardly toward the plate, the upper marginal edge of the panel member includes upwardly projecting teeth spaced therealong and the upper ends of the upstanding side edges of the plate are upwardly inclined toward each other and include intermediate upwardly opening slots for receiving the lower leg portions of small-legged game therein. A horizontal anchor panel is provided and one marginal edge of the anchor panel and the edge of the base plate on the side of the upstanding plate remote from the plate member include coacting structure releasably anchoring the anchor plate to the base plate. Further, an upper end portion of the panel member includes a horizontally elongated window formed therein.

4 Claims, 4 Drawing Figures

U.S. Patent     Oct. 25, 1977     4,054,968
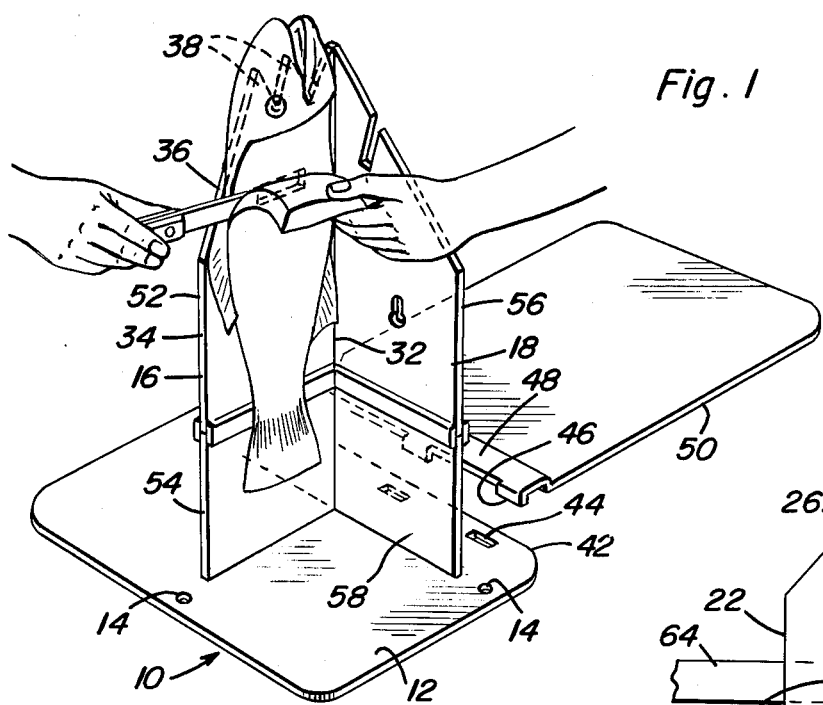
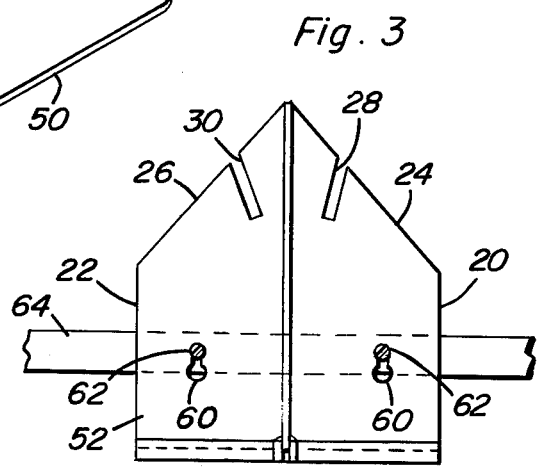
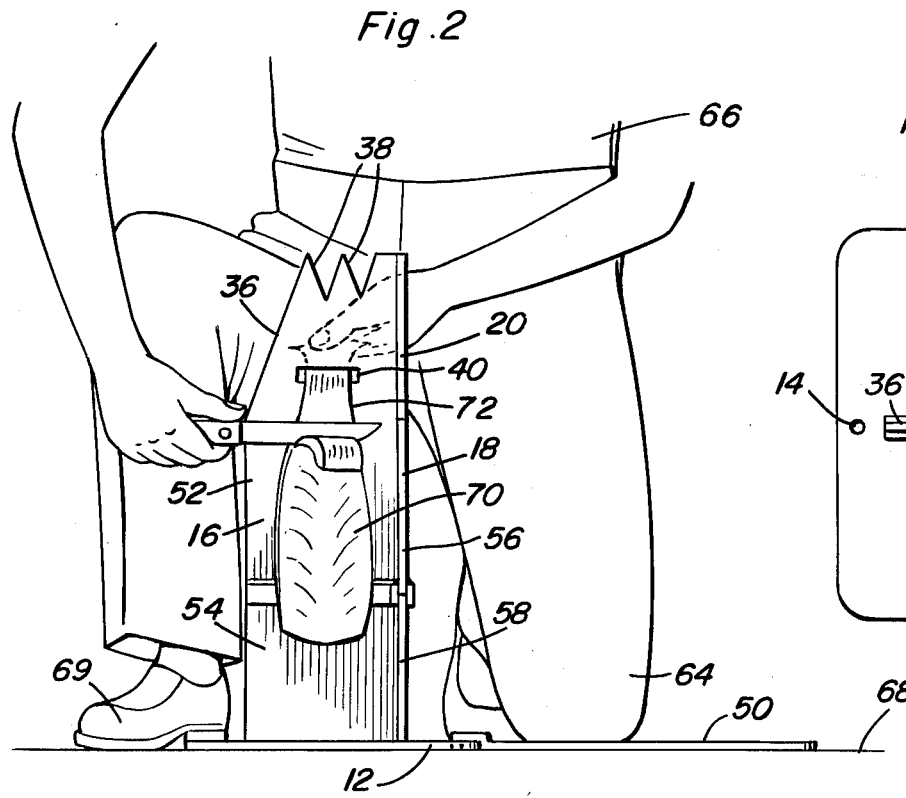
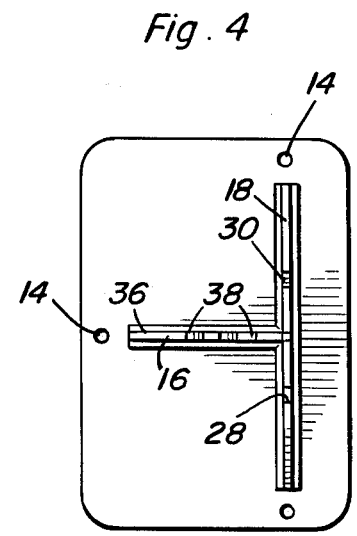

SMALL GAME HOLDER

BACKGROUND OF THE INVENTION

Various forms of small game holders have heretofore been provided. However, most small game holders have been specifically designed to support a single type of small game such as birds, fish or four-legged animals such as squirrels. In addition, many previously known types of small game holders are relatively expensive and cumbersome to use.

Examples of previously known game holders are disclosed in U.S. Pat. Nos. 20,703, 2,131,960, 2,624,910, 2,825,928, 2,895,696, 2,932,849, 3,023,725 and 3,237,240.

BRIEF DESCRIPTION OF THE INVENTION

The small game holder of the instant invention comprises an upright structure specifically designed to be utilized in supporting fish, birds and small four-legged animals. The holder includes a pair of upstanding plate and panel members disposed at right angles relative to each other and supported at their lower ends from a horizontal base plate. The panel member includes a horizontally elongated window formed in an upper portion thereof for receiving the tail of a fish therethrough and the upper edge of the same member is provided with longitudinally spaced teeth. On the other hand, the upper end portion of the plate member includes upwardly convergent side edge portions provided with upwardly opening slots for receiving the lower end portions of the legs of birds or small four-legged animals therein.

The main object of this invention is to provide a holder of the upright type from which a fish may be easily held in such a position as to allow a person to remove filets from the body of the fish and then to secure the filet in such a manner as to remove the meat from the skin.

Another object of this invention is to provide a game holder in accordance with the preceding object and constructed in a manner such that a game bird may easily be held in such a position as to allow a person to remove its feathers and dress the bird.

Still another object of this invention is to provide a holder which may be utilized in skinning small four-legged animals.

Yet a further object of this invention is to provide a game holder constructed in a manner whereby it may be readily supported from any flat surface such as a workbench or the ground and also supported from a horizontal fence member or post.

A final object of this invention to be specifically enumerated herein is to provide a game holder in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the game holder of the instant invention being utilized to support a fish during the process of removing a filet of meat from one side of the fish and with the anchor plate of the holer in an exploded or detached position;

FIG. 2 is a side elevational view of the holder with a fish filet being supported therefrom in a manner to cut the meat of the filet from the skin;

FIG. 3 is a fragmentary elevational view of a horizontal fence member or other similar support structure from which the upper portion of the holder is supported and with a game bird being supported from the holder; and FIG. 4 is a top plan view of the game holder with the anchor plate thereof removed.

DETAILED DESCRIPTION OF THE INVENTION

Referring now more specifically to the drawings, the numeral 10 generally designates the game holder of he instant invention. The holder 10 includes a horizontal base plate 12 having spaced marginal portions thereof suitably apertured as at 14 whereby the base plate may be anchored by means of suitable fasteners to a support surface such as a workbench or the like. An upstanding panel member 16 and an upstanding plate 18 have their lower ends supported from and anchored to the base plate 12. The plate 18 includes upstanding opposite side edges 20 and 22 including upwardly convergent upper end portions 24 and 26 provided with slightly upwardly divergent slots 28 and 30. The panel member 16 includes upstanding opposite side edges 32 and 34 with the edge 32 secured to one side of the plate 18. The upper end portion of the edge 34 is upwardly and inwardly inclined as at 36 and the panel member 16 includes an upper marginal edge portion having longitudinally spaced upwardly projecting teeth 38.

From FIG. 2 of the drawings it may be seen that the upper central portion of the panel member 16 includes a horizontally elongated window 40 and the marginal edge 42 of the base plate 12 on the side of the plate 18 remote from the panel member 16 includes longitudinally spaced slots 44 in which depending lugs 46 carried by an upwardly offset marginal portion 48 of an anchor plate 50 are removably engageable in a manner which will be apparent from a comparison of FIGS. 1 and 2 of the drawings.

The panel member 16 includes upper and lower sections 52 and 54 and the plate 18 includes upper and lower sections 56 and 58. Of course, the sections 54 and 58 are secured to the base plate 12 and the upper marginal portions of the sections 54 and 58 and the lower marginal portions of the sections 52 and 56 include coacting tongue-and-groove portions whereby the upper sections 52 and 56 are removably supported from the lower sections 54 and 58.

It may further be seen from FIGS. 1 and 3 of the drawings that opposite side portions of the section 52 include inverted keyhole openings 60 by which the upper section 52 may be removably supported from suitable headed fasteners 62 anchored to a horizontal support member 64 such as a fence rail.

In operation, if the holder 10 is to be utilized on the ground or a floor surface, the anchor plate 50 is engaged with the base plate 12 in the manner shown in FIG. 2 of the drawings and one knee 64 of the user 66 of the holder 10 may be placed upon the upper surface of the anchor plate 50 in order to hold the base plate 12 in position on the support surface 68. In addition, the opposite foot 69 of the user 66 may be placed upon one corner portion of the base plate 12. Then, a fish to be filleted may have its gills supported from a toothed upper marginal edge of the panel member 16 in the manner illustrated in FIG. 1 of the drawings enabling the user 66 to cut fillets of meat from opposite sides of the fish, the fish being reversed in position after the first fillet of meat is removed therefrom. Then, each fillet 70 may be supported with the tail portion thereof extending through the window 40 in the manner illustrated in FIG. 2 of the drawings and with the skin side of the fillet toward the panel member 16 whereupon the user 66 may cut downwardly along the skin in order to remove the meat of the fillet from the skin 72.

On the other hand, if a small game bird 74 is to be supported from the holder 10, the legs of the bird may be engaged in the slots 28 and 30 whereupon the bird will be supported in position to have its feathers plucked therefrom and enabling the user 66 to dress the bird. Still further, the front and rear legs of a four-legged animal may also be alternately engaged in the slots 28 for skinning purposes.

If the upper section 56 is to be supported from a fence rail such as the rail 64, the fasteners 62 may be first engaged with the rail 64 and then the upper section 56 may be repeatedly engaged with and disengaged from the fasteners 62.

The ability of the upper sections 52 and 56 to be disengaged from the lower sections 54 and 58 enables the holder 10 to be more compactly stored. In addition, when the section 56 is supported from the fence rail 64, the lower sections 54 and 58 are not needed. However, it will of course be noted that the panel member 16 as well as the plate 18 may be constructed out of single sheet metal sections, plastic, wood or other materials.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A game holder including an upstanding panel member, said panel member including at least an upper end portion tapering upwardly in width and terminating upwardly in a generally horizontal upper marginal edge portion provided with upwardly projecting teeth spaced therealong, said panel member including a lower portion having support means adapting said panel member to be supported from a stationary support structure, said panel member including upstanding opposite side edges, the upper end portion of one of side edges being inclined upwardly and inwardly toward the other side edge and defining said upwardly tapering upper end portion, an upstanding plate including upstanding side edges, the other side edge of said panel member being secured to and extending upwardly along one side of said plate centrally intermediate the upstanding side edges thereof with said plate and panel member being disposed at generally right angles relative to each other, said panel member including a horizontal window opening formed in said upper end portion a spaced distance below said upper marginal edge portion.

2. The combination of claim 1 said support means comprises a horizontal plate to whose central portion the lower ends of said panel member and upstanding plate are anchored.

3. The combination of claim 1 wherein said panel member and plate each include upper and lower sections with the upper sections secured to each other and removably supported from said lower sections.

4. A game holder including an upstanding panel member, said panel member including at least an upper end portion tapering upwardly in width and terminating upwardly in a generally horizontal upper marginal edge portion provided with upwardly projecting teeth spaced therealong, said panel member including a lower portion having support means adapting said panel member to be supported from a stationary support structure, said panel member including upstanding opposite side edges, the upper end portion of one of said side edges being inclined upwardly and inwardly toward the other side edge and defining said upwardly tapering upper end portion, an upstanding plate including upstanding side edges, the other side edge of said panel member being secured to and extending upwardly along one side of said plate centrally intermediate the upstanding side edges thereof with said plate and panel member being disposed at generally right angles relative to each other, the upper portions of said side edges of said plate being upwardly convergent and include narrow upwardly opening closed bottom slots for receiving the lower leg portions of small-legged game therein.

* * * * *